US011469629B2

(12) United States Patent
Jain et al.

(10) Patent No.: US 11,469,629 B2
(45) Date of Patent: Oct. 11, 2022

(54) SYSTEMS AND METHODS FOR SECURE WIRELESS TRANSMISSION OF POWER USING UNIDIRECTIONAL COMMUNICATION SIGNALS FROM A WIRELESS-POWER-RECEIVING DEVICE

(71) Applicant: Energous Corporation, San Jose, CA (US)

(72) Inventors: Deepak Jain, San Ramon, CA (US); Noorul Ameen Thufile Ahamed, San Jose, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 17/385,755

(22) Filed: Jul. 26, 2021

(65) Prior Publication Data
US 2022/0052564 A1 Feb. 17, 2022

Related U.S. Application Data

(60) Provisional application No. 63/178,465, filed on Apr. 22, 2021, provisional application No. 63/064,912, filed on Aug. 12, 2020.

(51) Int. Cl.
*H02J 50/80* (2016.01)
*H02J 50/23* (2016.01)
(Continued)

(52) U.S. Cl.
CPC .............. *H02J 50/80* (2016.02); *H02J 50/23* (2016.02); *H02J 50/27* (2016.02); *H02J 50/40* (2016.02); *H02J 7/00045* (2020.01); *H02J 50/60* (2016.02)

(58) Field of Classification Search
None
See application file for complete search history.

(56) References Cited

U.S. PATENT DOCUMENTS 10,153,653 B1 * 12/2018 Bell .................. H02J 5/005
2006/0252370 A1 * 11/2006 Goossens ................ H04B 5/02
455/41.1

(Continued)

FOREIGN PATENT DOCUMENTS

JP 2014217044 A 11/2014
WO WO 2016013944 A1 1/2016

OTHER PUBLICATIONS

Energous Corp., ISRWO, PCT/US2021/045269, Dec. 7, 2021, 7 pgs.

*Primary Examiner* — Jared Fureman
*Assistant Examiner* — Joel Barnett
(74) *Attorney, Agent, or Firm* — Morgan, Lewis & Bockius LLP

(57) ABSTRACT

An exemplary embodiment of secure wireless transmission of power using unidirectional communication signals from a wireless-power-receiving device. The method includes, receiving, from a wireless-power-transmitting device that includes a first communications radio, a first wireless-power-transmission signal at a wireless-power-receiving device that includes a second communications radio. In response to receiving the first wireless-power-transmission signal: broadcasting, via the second communications radio of the wireless-power-receiving device and without establishing a communications channel between the first and second communications radios, a data packet, the data packet including information identifying (i) at least one power requirement of a power source of the wireless-power-receiving device (ii) an amount of power received by the wireless-power-receiving device from the first wireless-power-transmission signal. After broadcasting the data packet, receiving, from the wireless-power-transmitting device, additional wireless-power-transmission signals at the wireless-power-receiving device, wherein the wireless- (Continued)

power-transmitting device transmits each of the additional wireless-power-transmission signals using a predetermined sequence of different transmission characteristics.

48 Claims, 10 Drawing Sheets

(51) Int. Cl.
  *H02J 50/40* (2016.01)
  *H02J 50/27* (2016.01)
  *H02J 50/60* (2016.01)
  *H02J 7/00* (2006.01)

(56) References Cited

U.S. PATENT DOCUMENTS

2016/0126775 A1* 5/2016 Park ............... H02J 7/00034
    320/108
2018/0316391 A1* 11/2018 Hijikata ............ H04B 5/0037

* cited by examiner

Wireless Power Transmission Environment 100

500

516 The data packet and the additional data packets are broadcast via a Bluetooth low energy (BLE) communication protocol

518 The additional data packets include information that causes the wireless-power-transmitting device to adjust characteristics of the additional wireless-power-transmission signals provided to the wireless-power receiving device, wherein the wireless-power-transmitting device adjusts characteristics of the additional wireless power transmission signals when the information specifies that the wireless-power-receiving device (i) is not charging, (ii) is charging but needs more power, (iii) is charging at an optimal configured rate, (iv) is charging but is receiving too much power, or (v) has a fault condition

520 The wireless-power-receiving device is within a wireless-power-transmission range of the wireless-power-transmitting device when the second communications radio transmits the data packet

522 The wireless-power-transmission range is a near-field transmission range of less than or equal to 12 inches from the wireless-power-transmitting device

524 The wireless-power-transmission range is a far-field transmission range of greater than 12 inches from the wireless-power-transmitting device

526 The wireless-power-receiving device is placed within the wireless-power-transmission range before receiving the first wireless-power-transmission signal at the wireless-power-receiving device and while the first communications radio of the wireless-power-transmitting device is not scanning, and
the wireless-power-transmitting device causes the first communications radio to begin scanning for broadcasted data packets in response to detecting the wireless-power-receiving device within the wireless-power-transmission range

528 The predetermined sequence of different transmission characteristics is a sequence in which the wireless-power-transmitting device sends the additional wireless-power-transmission signals at different points in time by toggling transmissions on and off over a given period of time 530 The predetermined sequence of different transmission characteristics is a sequence in which the wireless-power-transmitting device transmits each of the additional wireless-power-transmission signals using different power levels 532 The second communications radio of the wireless-power-receiving device communicates in a unidirectional manner with the first communications radio of the wireless-power-transmitting device and does not receive communication from the wireless-power-transmitting device 534 The wireless-power-receiving device broadcasts each of the data packet and the additional data packets at a predetermined time interval 536 The predetermined time interval is equal to 100ms or less.

538 The data packet and each respective additional data packet include information about current charging state, voltage, power received from the wireless-power-transmitting device, and information indicating whether more or less power is required 540 The data packet and each respective additional data packet include encrypted data 542 The wireless-power-receiving device includes a wireless-power-receiving circuit with power-harvesting circuitry and a memory of approximately 32 KBs, and the instructions occupy approximately 5 KBs or less of the memory 544 The data packet and the additional data packets also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition

Figure 5C

SYSTEMS AND METHODS FOR SECURE WIRELESS TRANSMISSION OF POWER USING UNIDIRECTIONAL COMMUNICATION SIGNALS FROM A WIRELESS-POWER-RECEIVING DEVICE

RELATED APPLICATION

This application claims priority from U.S. Provisional Application Ser. No. 63/178,465, filed Apr. 22, 2021, entitled "Systems and Methods for Secure Wireless Transmission of Power Using Unidirectional Communication Signals from A Wireless-Power-Receiving Device," and also claims priority from U.S. Provisional Application Ser. No. 63/064,912, filed Aug. 12, 2020, entitled "Systems and Methods for Secure Wireless Transmission of Power Using Unidirectional Communication Signals from A Wireless-Power-Receiving Device," both of which are incorporated by this reference herein in their respective entireties.

TECHNICAL FIELD

The embodiments herein generally relate to systems and methods for wireless power transmission and, more specifically, to systems and methods for secure wireless transmission of power using unidirectional communication signals from a wireless-power-receiving device.

BACKGROUND

Some wireless power transmission systems, such as charging pads, utilize bidirectional communication between a wireless power receiving device and a wireless power transmitting device (e.g., a charging pad). These charging pads (e.g., wireless power transmitting devices) have to communicate with wireless-power-receiving devices to ensure that the device to be charged is the correct device, and to receive charging information (e.g., battery level, charge state, power needed, etc.). Bidirectional communication frameworks can take up a lot of storage space on the limited memory available on certain circuits used in conjunction with the reception of wireless power. Since storage is at a premium on these circuits, bidirectional communication can be undesirable, so there is a need for a communication framework that takes up less space, while still ensuring that power can be wirelessly transmitted in a secure way.

SUMMARY

Accordingly, there is a need for a communication framework implemented at a wireless-power-receiving device (e.g., a device that includes (i) wireless-power-receiving circuitry, including at least one antenna and power-conversion circuitry for converting wirelessly-delivered energy into usable power and (ii) an electronic device, such as a smartphone, smart watch, laptop, hearing aid, that is configured to be powered or charged by the usable power from the wireless-power-receiving circuitry) that uses minimal storage space. To this end, systems and methods are described herein that are capable of allowing wireless-power-receiving devices to receive a charge without establishing a communication channel (e.g., no handshake protocol is exchanged between a communication radio of a receiving device and a communication radio of a transmitting device). Instead of a bidirectional communication channel being used to communicate information related to wireless charging (e.g., radio frequency power waves delivered over a distance to wireless-power-receiving circuitry that then converts energy from the RF power waves to usable power for charging or powering an electronic device coupled with the wireless-power-receiving device), unidirectional advertisements can be used to achieve desired results of a secure transmission of wireless power. In this improved communication framework, the wireless-power-receiving device is able to transmit advertisements, and a nearby wireless-power-transmitting device is able to receive information that allows it to determine and adjust to the charging needs of the wireless-power-receiving device based on data included in these advertisements. Then the wireless-power-transmitting device provides a wirelessly-delivered charge to the wireless-power-receiving device. In some embodiments using this framework, there is no communication received at the wireless-power-receiving device from the wireless-power-transmitting device. Thus, the wireless-power-receiving circuitry can be coupled with many different types of electronic devices (e.g., smartphones, smart watches, laptops, hearing aids, etc.) to allow those electronic devices to be wirelessly charged using this unidirectional communication framework and those electronic devices do not need additional software to allow them to receive a wireless charge. In other words, this new framework is advantageous over a bidirectional communication framework because it can be implemented using less storage space on the wireless-power-receiving device (while also not requiring any additional, or a very minimal amount of, storage space on an electronic device that is coupled with the wireless-power-receiving circuitry) without sacrificing security.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 5A-5C show flow diagrams of a method of transmitting unidirectional communication signals, in accordance with some embodiments.

Figure 1A:
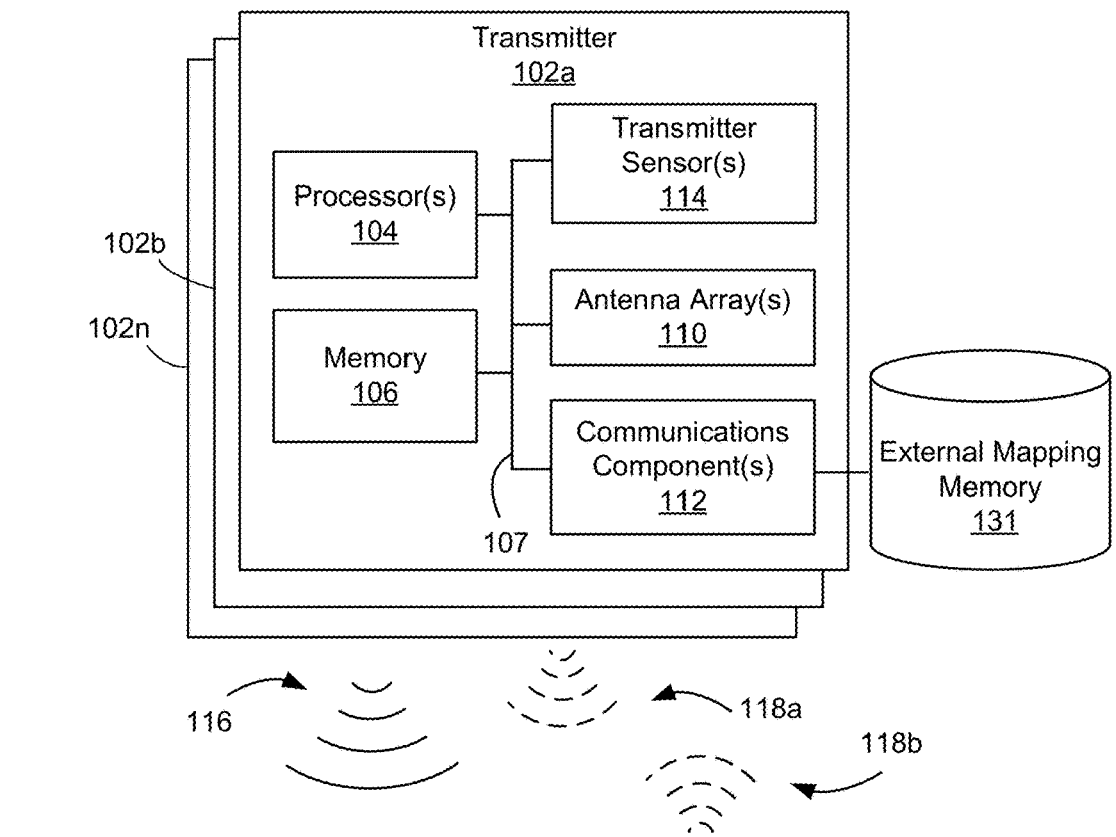
FIG. 1A is a block diagram of an RF wireless power transmission system, in accordance with some embodiments.
Figure 1A:
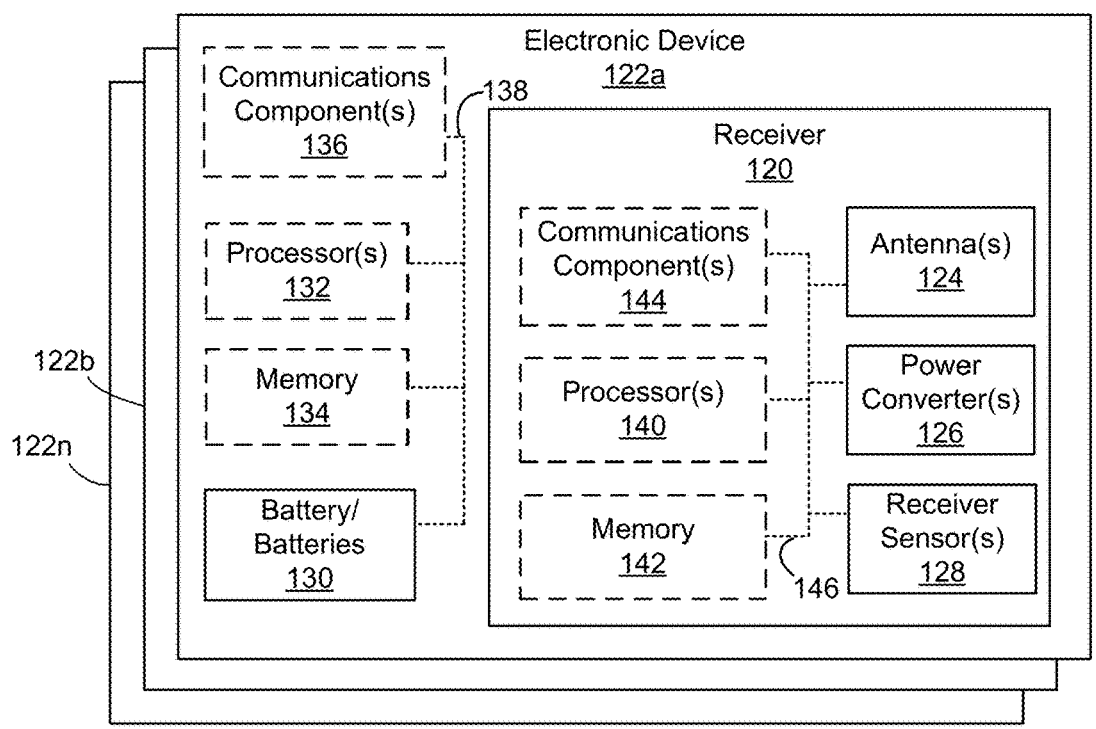

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of components of wireless power transmission environment 100, in accordance with some embodiments. Wireless power transmission environment 100 includes, for example, transmitters 102 (e.g., transmitters 102a, 102b . . . 102n), and one or more receivers 120 (e.g., receivers 120a, 120b . . . 120n). In some embodiments, each respective wireless power transmission environment 100 includes a number of receivers 120 (also referred to as wireless-power-receiving circuitry), each of which is associated with a respective electronic device 122. In some instances, the transmitter 102 is referred to herein as a "wireless-power-transmitting device" or a "wireless power transmitter." Additionally, in some instances, the receiver 120 and the electronic device 122a, when coupled together are collectively referred to herein as a "wireless-power-receiving device."

An example transmitter 102 (e.g., transmitter 102a) includes, for example, one or more processor(s) 104, a memory 106, one or more antenna arrays 110, one or more communications components 112 (also referred to herein as a "wireless communications radio," a "communications radio" or simply a "radio"), and/or one or more transmitter sensors 114. In some embodiments, these components are interconnected by way of a communications bus 107. References to these components of transmitters 102 cover embodiments in which one or more of these components (and combinations thereof) are included. The components are discussed in further detail below with reference to FIG. 2.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of signals 116 by antenna array 110), one or more communications component processors (e.g., in some embodiments the communications component is configured to receive communications transmitted by a wireless-power-receiving device without opening a communication channel, for example this also can mean that no handshake protocol is necessary to allow the transmitter and receiving devices to communicate with one another during a wireless-charging process (as described in more detail below in reference to FIGS. 4 and 5A-5C) and/or one or more sensor processors (configured to, e.g., control operation of transmitter sensor 114 and/or receive output from transmitter sensor 114).

The receiver 120 receives power transmission signals 116. In some embodiments, the receiver 120 includes one or more antennas 124 (e.g., an antenna array including multiple antenna elements), power converter 126, receiver sensor 128, and/or other components or circuitry (e.g., processor(s) 140, memory 142, and/or communication component(s) 144. In some embodiments, these components are interconnected by way of a communications bus 146. References to these components of receiver 120 cover embodiments in which one or more of these components (and combinations thereof) are included.

The receiver 120 converts energy from received signals 116 (also referred to herein as RF power transmission signals, or simply, RF signals, RF waves, power waves, or power transmission signals) into electrical energy to power and/or charge electronic device 122. For example, the receiver 120 uses the power converter 126 to convert energy derived from power waves 116 to alternating current (AC) electricity or direct current (DC) electricity to power and/or charge the electronic device 122. Non-limiting examples of the power converter 126 include rectifiers, rectifying circuits, voltage conditioners, among suitable circuitry and devices.

In some embodiments, the receiver 120 is a standalone device that is detachably coupled to one or more electronic devices 122. For example, the electronic device 122 has processor(s) 132 for controlling one or more functions of the electronic device 122, and the receiver 120 has processor(s) 140 for controlling one or more functions of the receiver 120.

In some embodiments, the receiver 120 is a component of the electronic device 122. For example, processors 132 control functions of the electronic device 122 and the receiver 120. In addition, in some embodiments, the receiver 120 includes one or more processors 140, which communicates with processors 132 of the electronic device 122.

In some embodiments, the electronic device 122 includes one or more processors 132, memory 134, one or more communication components 136, and/or one or more batteries 130. In some embodiments, these components are interconnected by way of a communications bus 138. In some embodiments, communications between electronic device 122 and receiver 120 occur via communications component(s) 136 and/or 144. In some embodiments, communications between the electronic device 122 and the receiver 120 occur via a wired connection between communications bus 138 and communications bus 146. In some embodiments, the electronic device 122 and the receiver 120 share a single communications bus.

In some embodiments, the receiver 120 receives one or more power waves 116 directly from the transmitter 102 (e.g., via one or more antennas 124). In some embodiments, the receiver 120 harvests power waves from one or more pockets of energy created by one or more power waves 116 transmitted by the transmitter 102. In some embodiments, the transmitter 102 is a near-field transmitter that transmits the one or more power waves 116 within a near-field distance (e.g., less than approximately six inches away from the transmitter 102, or in some other examples, less than (approximately) twelve inches away from the transmitter 102). In other embodiments, the transmitter 102 is a far-field transmitter that transmits the one or more power waves 116 within a far-field distance (e.g., more than approximately six inches away from the transmitter 102, or in some other examples more than (approximately) twelve inches away from the transmitter 102).

After the power waves 116 are received and/or energy is harvested from them, circuitry (e.g., integrated circuits, amplifiers, rectifiers, and/or voltage conditioner) of the receiver 120 converts the energy of the power waves to usable power (i.e., electricity), which powers the electronic device 122 and/or is stored to battery 130 of the electronic device 122. In some embodiments, a rectifying circuit of the receiver 120 translates the electrical energy from AC to DC for use by the electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, the electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into power for charging the electronic devices 122.

In some embodiments, the one or more transmitters 102 adjust values of one or more characteristics (e.g., waveform characteristics, such as phase, gain, direction, amplitude, polarization, and/or frequency) of power waves 116. For example, a transmitter 102 selects a subset of one or more antenna elements of antenna array 110 to initiate transmission of power waves 116, cease transmission of power waves 116, and/or adjust values of one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust values of one or more characteristics for transmitting the power waves 116 to account for changes at the wireless power receiver that may negatively impact transmission of the power waves 116. As described in more detail below, the adjustments made by the transmitter can be determined based on data provided in unidirectional communication signals from the wireless-power-receiving device (e.g., in which the communication component 136 of the device 122a can be used to advertise data related to the receipt of RF power waves by the receiver 120, as described in more detail below in reference to FIGS. 4 and 5A-5C).

Note that, in some embodiments, the transmitter 102 utilizes beamforming techniques to wirelessly transfer power to a receiver 120, while in other embodiments, the transmitter 102 does not utilize beamforming techniques to wirelessly transfer power to a receiver 120 (e.g., in circumstances in which no beamforming techniques are used, the transmitter controller IC 160 discussed below might be designed without any circuitry to allow for use of beamforming techniques, or that circuitry may be present, but might be deactivated to eliminate any beamforming control capability).

In some embodiments, respective antenna arrays 110 of the one or more transmitters 102 may include a set of one or more antennas configured to transmit the power waves 116 into respective transmission fields of the one or more transmitters 102. Integrated circuits (FIG. 1C) of the respective transmitter 102, such as a controller circuit (e.g., a radio frequency integrated circuit (RFIC)) and/or waveform generator, may control the behavior of the antennas. For example, based on the information received from the receiver 120 by way of the communication signal 118 (e.g., an advertisement such as a Bluetooth Low Energy (BLE) advertisement), a controller circuit (e.g., processor 104 of the transmitter 102, FIG. 1A) may determine values of the waveform characteristics (e.g., amplitude, frequency, trajectory, direction, phase, polarization, among other characteristics) of power waves 116 that would effectively provide power to the receiver 120, and in turn, the electronic device 122. The controller circuit may also identify a subset of antennas from the antenna arrays 110 that would be effective in transmitting the power waves 116. In some embodiments, a waveform generator circuit (not shown in FIG. 1A) of the respective transmitter 102 coupled to the processor 104 may convert energy and generate the power waves 116 having the specific values for the waveform characteristics identified by the processor 104/controller circuit, and then provide the power waves to the antenna arrays 110 for transmission.

In some embodiments, the communications component 112 transmits communication signals 118 by way of a wired and/or wireless communication connection to the receiver 120. In some embodiments, the communications component 112 does not transmit anything to the receiver 120, and merely uses the communication component 112 to receive communications (e.g., BLE advertisements) from the receiver 120. In some embodiments, when the communications component 112 does not transmit anything to the receiver 120 there is no established communication channel between the communications component 112 and the receiver 120, which in some embodiments means that the receiving and transmitting devices do not need to go through a handshake protocol to allow for the receiving device to send BLE advertisements to the transmitting device. In some embodiments, the communications component 112 generates beacon signals 118a used for triangulation of the receiver 120 (e.g., test signals). In some embodiments, the beacon signals 118a are used to convey information regarding charging availability from the transmitter 102 to the receiver 120. In some embodiments, the signals 118a are used for adjusting values of one or more waveform characteristics used to transmit the power waves 116 (e.g., convey amounts of power derived from RF test signals). In some embodiments, the transmitter 102 does not need to convey information to the receiver 120 about adjusting values of one or more waveform characteristics to transmit power waves 116, because the advertisements transmitted from the receiver convey all necessary information to allow the transmitter 102 to provide power to the receiver. In some embodiments, the beacon signals 118a include information related to status, efficiency, user data, power consumption, billing, geo-location, and other types of information (as is described in more detail below). In some embodiments, unidirectional advertisement signals 118b are used to convey information regarding charging requirements from the receiver 120 to the transmitter 102. In some embodiments, only the unidirectional advertisement signals 118*b* transmitted from the receiver 120 to the transmitter 102 include information related to status, efficiency, user data, power consumption, charging information, billing, geo-location, and other types of information.

In some embodiments, the communications component 112 includes a communications component antenna for communicating with the receiver 120 and/or other transmitters 102 (e.g., transmitters 102*b* through 102*n*). In some embodiments, these beacon signals 118*a* unidirectional advertisement signals 118*b* are sent using a first channel (e.g., a first frequency band) that is independent and distinct from a second channel (e.g., a second frequency band distinct from the first frequency band) used for transmission of the power waves 116. In some embodiments, no channel is created between the transmitter 102 and the receiver 120, and the communications component 112 receives incoming advertisements (e.g., BLE advertisements).

In some embodiments, the receiver 120 optionally includes a receiver-side communications component 144 (which can also be referred to herein as a second communications radio, while the communications component 112 can be referred to herein as a first communications radio) configured to communicate various types of data with one or more of the transmitters 102, through a respective communication signal generated by the receiver-side communications component (in some embodiments, a respective communication signal is referred to as an advertising or advertisement signal). In other embodiments, the receiver 120 can be configured to use the communications component 136 of the device 122*a* for the purpose of communicating the unidirectional communication advertisements discussed herein (the descriptions herein of the unidirectional advertisements apply to circumstances in which the receiver 120 uses its own communications component 144, as well as to circumstances in which the receiver 120 uses the communications component 136 of the device 122*a*). The data may include location indicators for the receiver 120 and/or electronic device 122, a power status of the device 122, status information for the receiver 120, status information for the electronic device 122 (e.g., not charging, charging but needs more power, charging at optimal configured rate, charging but receiving too much power, any fault condition, etc.), status information about the power waves 116 (e.g., whether the electronic device 122 requires charging, battery is critical, whether the receiver is on the charger (e.g., transmitter 102) or not (array voltage detected), etc.), and/or status information for pockets of energy. In other words, the receiver 120 may provide data to the transmitter 102, by way of the beacon signals 118*a* and/or unidirectional advertisement signals 118*b* regarding the current operation of the system 100, including: information identifying a present location of the receiver 120 or the device 122, an amount of energy (i.e., usable power) received by the receiver 120, and an amount of power received and/or used by the electronic device 122, among other possible data points containing other types of information.

Figure 4:
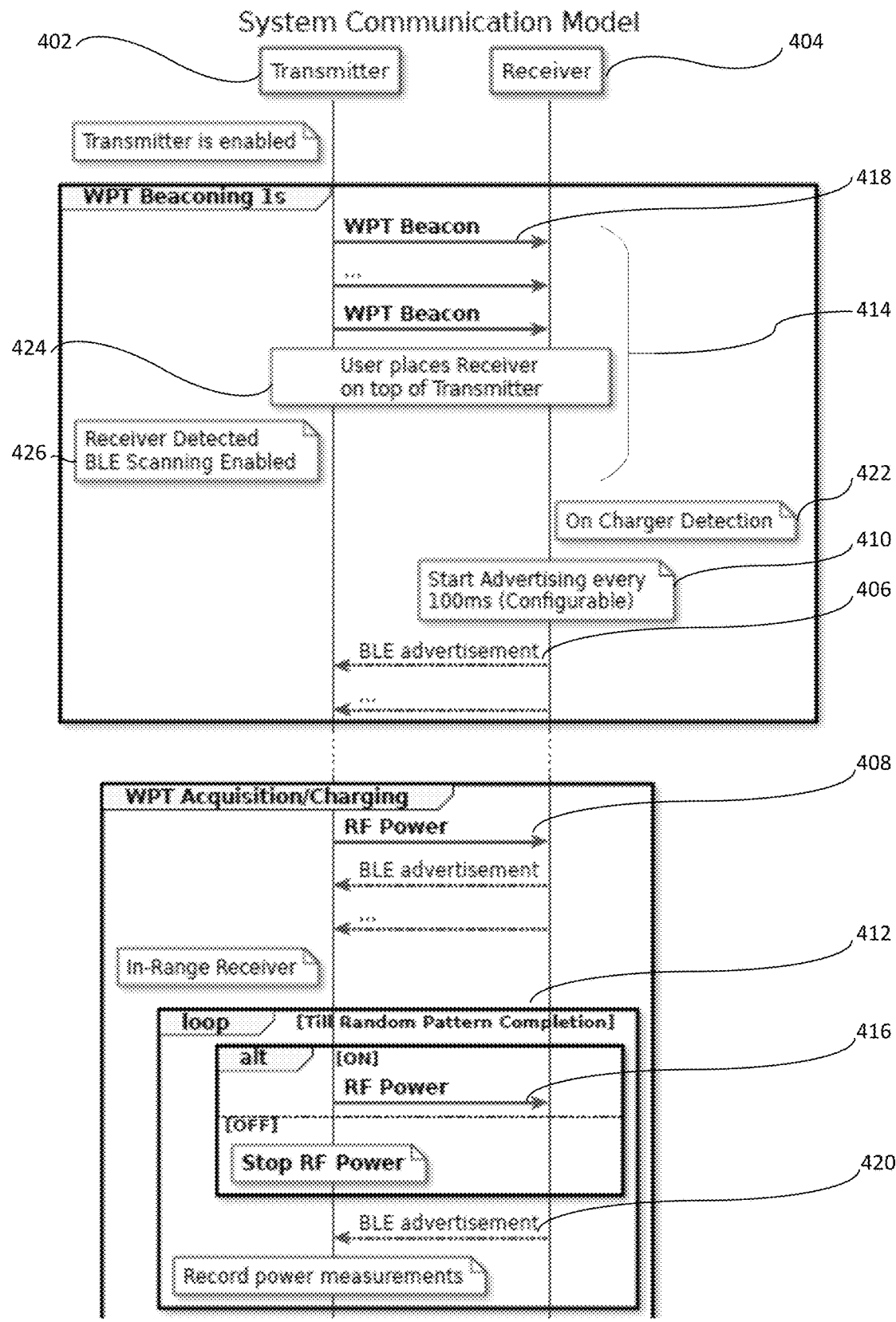
FIG. 4 is a schematic flow diagram illustrating secure wireless transmission of power using unidirectional communication signals from a wireless-power-receiving device.

In some embodiments, the data contained within beacon signals 118*a* and/or unidirectional advertisement signals 118*b* is used by the electronic device 122, the receiver 120, and/or the transmitters 102 for determining adjustments to values of one or more waveform characteristics used by the antenna array 110 to transmit the power waves 116. In some embodiments, the receiver 120 uses a beacon signals 118*a* and/or unidirectional advertisement signals 118*b* to communicate data for, e.g., alerting transmitters 102 that the receiver 120 has entered or is about to enter a transmission field (e.g., come within wireless-power-transmission range of a transmitter 102), provide information about the electronic device 122, provide user information that corresponds to the electronic device 122, indicate the effectiveness of received power waves 116, and/or provide updated characteristics or transmission parameters that the one or more transmitters 102 use to adjust transmission of the power waves 116. In some embodiments, the alerting of transmitters occurs in response to the electronic device 122 detecting a transmitter beacon signal produced by the transmitter 102. In some embodiments, the transmitter beacon signal is a low-power RF signal, such that the transmitter beacon signal has a lower power level relative to additional wireless-power-transmission signals that are transmitted subsequently after the transmitter has determined that the receiver is within a wireless-power-transmission range of the transmitter (an example of this is shown in the flowchart of FIG. 4).

In some embodiments, transmitter sensor 114 and/or receiver sensor 128 detect and/or identify conditions of the electronic device 122, the receiver 120, the transmitter 102, and/or a transmission field. In some embodiments, data generated by the transmitter sensor 114 and/or receiver sensor 128 is used by the transmitter 102 to determine appropriate adjustments to values of one or more waveform characteristics used to transmit the power waves 116. Data from transmitter sensor 114 and/or receiver sensor 128 received by the transmitter 102 includes, for example, raw sensor data and/or sensor data processed by a processor 104, such as a sensor processor. Processed sensor data includes, for example, determinations based upon sensor data output. In some embodiments, sensor data received from sensors that are external to the receiver 120 and the transmitters 102 is also used (such as thermal imaging data, information from optical sensors, and others).

Figure 1B:
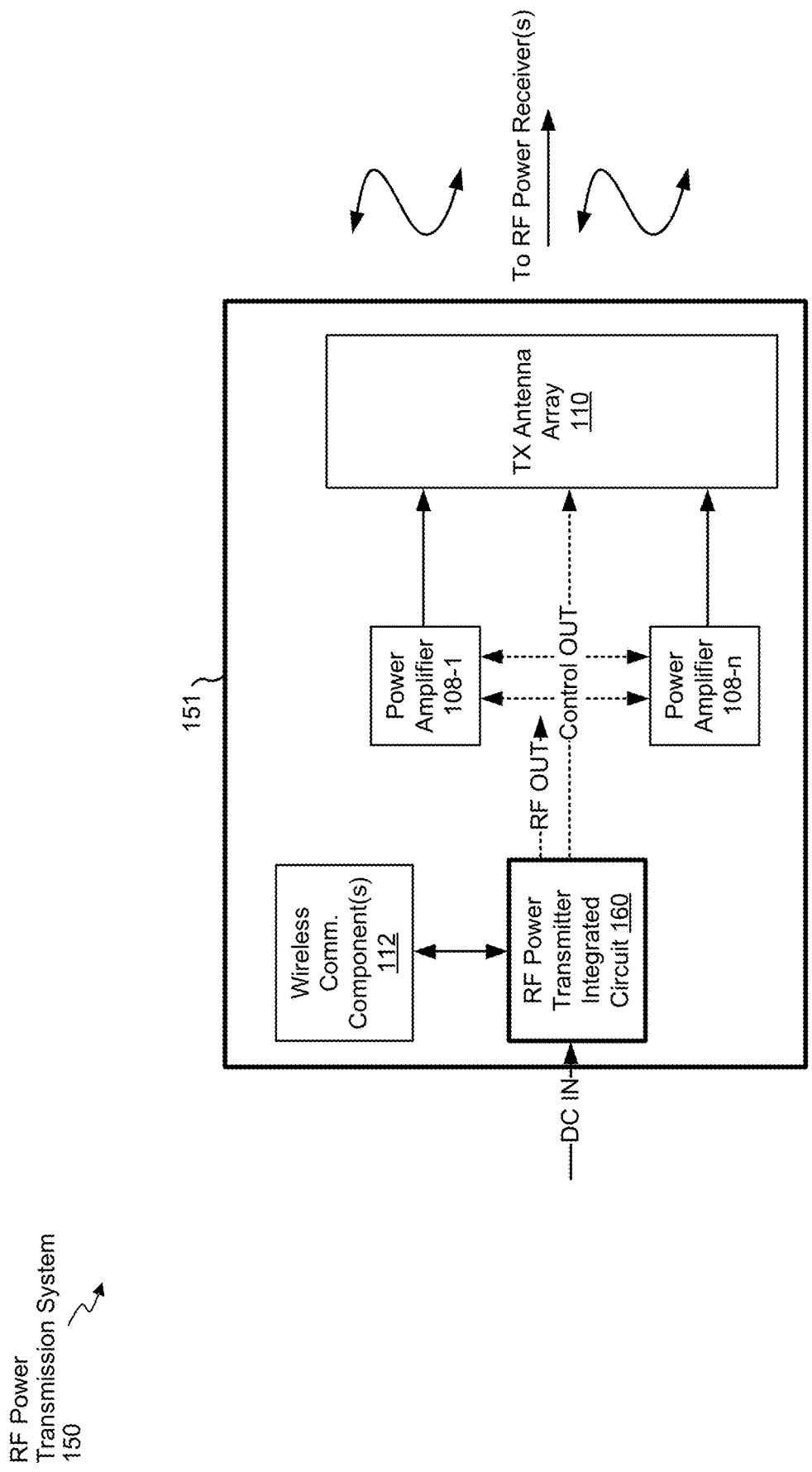
FIG. 1B is another block diagram of an RF wireless power transmission system, in accordance with some embodiments.

FIG. 1B is another block diagram of an RF wireless power transmission system 150 in accordance with some embodiments. In some embodiments, the RF wireless power transmission system 150 includes a far-field transmitter (not shown). In some embodiments, the RF wireless power transmission system 150 includes a near-field transmitter that, in some embodiments, can be part of an RF charging pad 151 (also referred to herein as a near-field (NF) charging pad 151 or RF charging pad 151). The RF charging pad 151 may be an example of the transmitter 102 in FIG. 1A.

In some embodiments, the RF charging pad 151 includes an RF power transmitter integrated circuit 160 (described in more detail below). In some embodiments, the RF charging pad 151 includes one or more communications components 112 (e.g., wireless communication components, such as WI-FI or BLUETOOTH radios). In some embodiments, the RF charging pad 151 also connects to one or more power amplifier units 108-1, . . . 108-*n* (PA or PA units) to control operation of the one or more power amplifier units when they drive external power-transfer elements (e.g., antennas 290). In some embodiments, RF power is controlled and modulated at the RF charging pad 151 via switch circuitry as to enable the RF wireless power transmission system to send RF power to one or more wireless receiving devices via the TX antenna array 110.

Figure 1C:
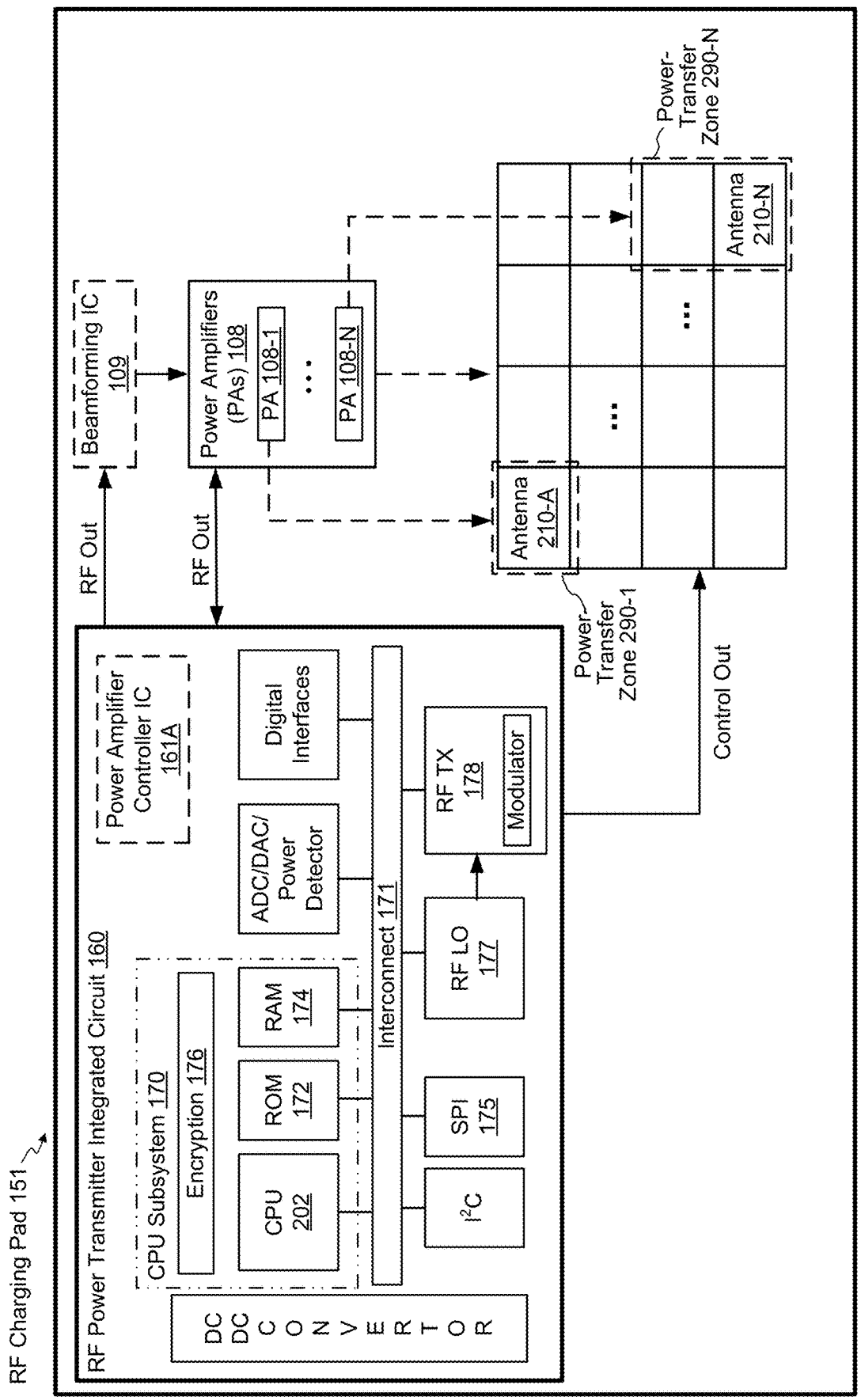
FIG. 1C is a block diagram showing components of an example RF charging pad that includes an RF power transmitter integrated circuit and antenna zones, in accordance with some embodiments.

FIG. 1C is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g., an I²C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 150.

In some embodiments, the RF IC 160 also includes (or is in communication with) a power amplifier controller IC 161A (PA IC) that is responsible for controlling and managing operations of a power amplifier (or multiple power amplifiers), including for reading measurements of impedance at various measurement points within the power amplifier 108, whereby these measurements are used, in some instances, for detecting of foreign objects. The PA IC 161A may be on the same integrated circuit at the RF IC 160, or may be on its on integrated circuit that is separate from (but still in communication with) the RF IC 160. Additional details regarding the architecture and operation of the PA IC are provided in U.S. Provisional Patent Application No. 62/03,677, the disclosure of which is incorporated by reference herein in its entirety.

In some embodiments, executable instructions running on the CPU (such as those shown in the memory 106 in FIG. 2 and described below) are used to manage operation of the RF charging pad 151 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna zones and power-transfer zones, which terms are used synonymously in this disclosure. In some embodiments the antenna/power-transfer zones may include antenna elements that transmit propagating radio frequency waves but, in other embodiments, the antenna/power-transfer zones may instead include capacitive charging couplers that convey electrical signals but do not send propagating radio frequency waves.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zone 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160. In embodiments in which capacitive couplers (e.g., capacitive charging couplers 244) are used as the antennas 210, then optional beamforming IC 109 may not be included in the RF power transmitter integrated circuit 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver). In some embodiments, the PA IC 161A receives the viable RF power level and provides that to the one or more power amplifiers 108.

In some embodiments, the one or more power amplifiers 108 then provide RF signals to the antenna zones 290 (also referred to herein as "power-transfer zones") for transmission to wireless power receivers that are authorized to receive wirelessly delivered power from the RF charging pad 151. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 151 to sequentially or selectively activate different antenna zones in order to determine the most efficient antenna zone 290 to use for transmitting wireless power to a wireless power receiver. In some embodiments, the one or more power amplifiers 108 are also in communication with the CPU subsystem 170 to allow the CPU 202 to measure output power provided by the PAs 108 to the antenna zones 110 of the RF charging pad 151.

FIG. 1C also shows that, in some embodiments, the antenna zones 290 of the RF charging pad 151 may include one or more antennas 210A-N. In some embodiments, each antenna zone of the plurality of antenna zones 290 includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 151. In some embodiments, each antenna zone 290 may include antennas of different types, while in other embodiments each antenna zone 290 may include a single antenna of a same type, while in still other embodiments, the antennas zones may include some antenna zones that include a single antenna of a same type and some antenna zones that include antennas of different types. In some embodiments the antenna/power-transfer zones may also or alternatively include capacitive charging couplers that convey electrical signals but do not send propagating radio frequency waves.

In some embodiments, the RF charging pad 151 may also include a temperature monitoring circuit that is in communication with the CPU subsystem 170 to ensure that the RF charging pad 151 remains within an acceptable temperature range. For example, if a determination is made that the RF charging pad 151 has reached a threshold temperature, then operation of the RF charging pad 151 may be temporarily suspended until the RF charging pad 151 falls below the threshold temperature.

By including the components shown for RF power transmitter circuit 160 (FIG. 1C) on a single chip, such transmitter chips are able to manage operations at the transmitter chips more efficiently and quickly (and with lower latency), thereby helping to improve user satisfaction with the charging pads that are managed by these transmitter chips. For example, the RF power transmitter circuit 160 is cheaper to construct, has a smaller physical footprint, and is simpler to install.

Figure 1D:
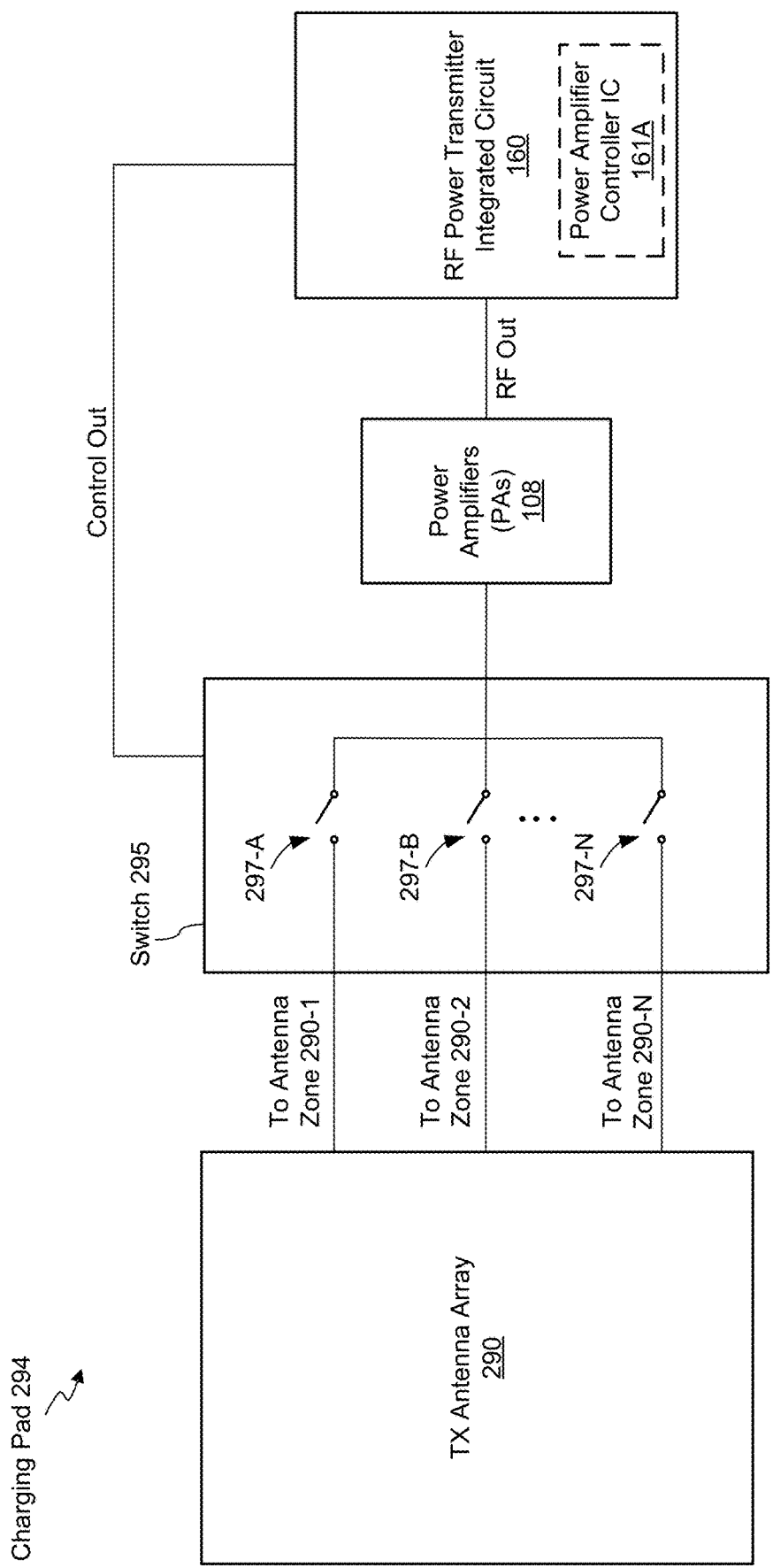
FIG. 1D is a block diagram showing components of an example RF charging pad that includes an RF power transmitter integrated circuit coupled to a switch, in accordance with some embodiments.

FIG. 1D is a block diagram of a charging pad 294 in accordance with some embodiments. The charging pad 294 is an example of the charging pad 151 (FIG. 1B), however, one or more components included in the charging pad 151 are not included in the charging pad 294 for ease of discussion and illustration.

The charging pad 294 includes an RF power transmitter integrated circuit 160, one or more power amplifiers 108, a PA IC 161A (which may be on the same or a separate IC from the RF power transmitter IC 160), and a transmitter antenna array 290 having multiple antenna zones. Each of these components is described in detail above with reference to FIGS. 1A-1C. Additionally, the charging pad 294 includes a switch 295 (i.e., transmitter-side switch), positioned between the power amplifiers 108 and the antenna array 290, having a plurality of switches 297-A, 297-B, . . . 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1C) of the antenna array 290, switch 297-B may be coupled with a second antenna zone 290-2 of the antenna array 290, and so on. Each of the plurality of switches 297-A, 297-B, . . . 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, . . . 297-N may be closed at the same time, thereby creating multiple unique pathways to the antenna array 290 that may be used simultaneously.

In some embodiments, the RF power transmitter integrated circuit 160 (or the PA IC 161A, or both) is (are) coupled to the switch 295 and is configured to control operation of the plurality of switches 297-A, 297-B, . . . 297-N (illustrated as a "control out" signal in FIGS. 1B and 1D). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

In some embodiments, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1D is merely one example.

Figure 2:
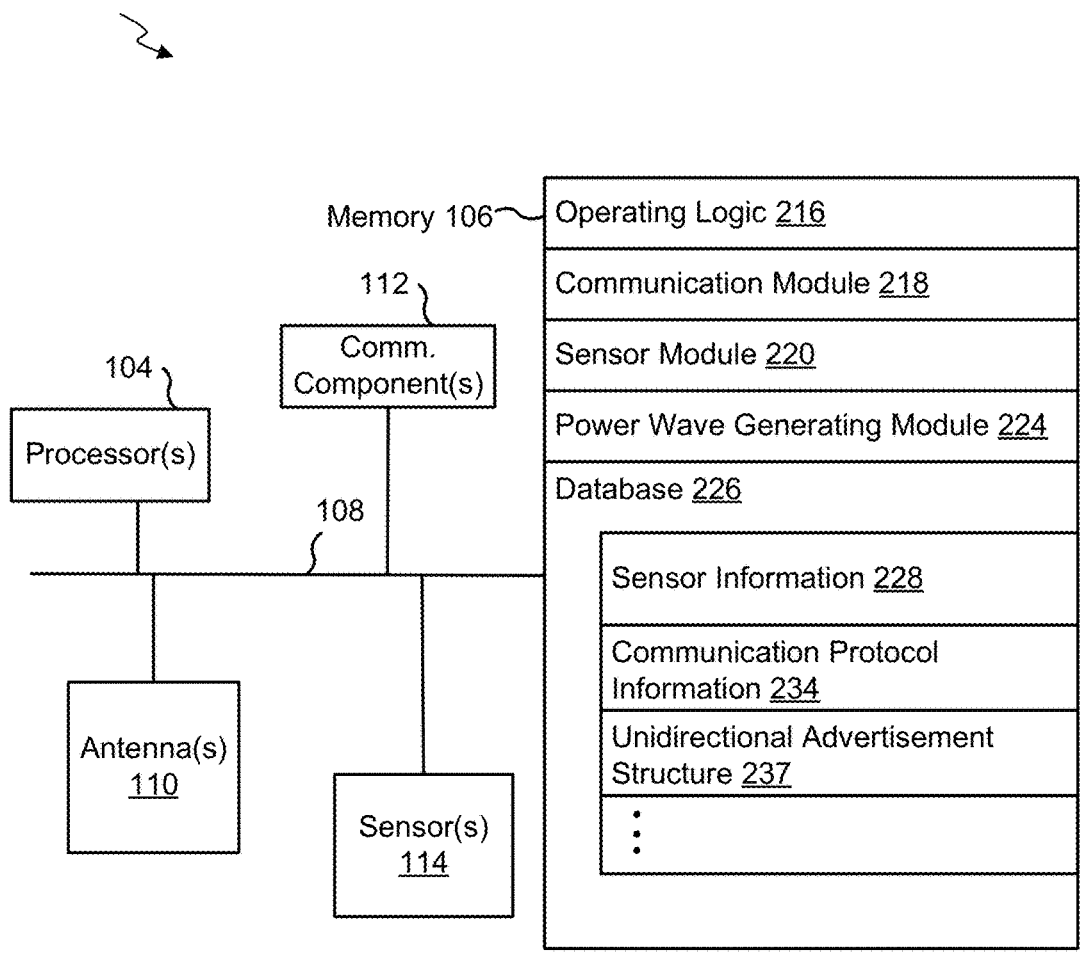
FIG. 2 is a block diagram showing components of an example RF transmitter, in accordance with some embodiments.

FIG. 2 is a block diagram illustrating a representative transmitter device 102 (also sometimes referred to herein as a transmitter 102, a wireless power transmitter 102, and a wireless-power-transmitting device 102) in accordance with some embodiments. In some embodiments, the transmitter device 102 includes one or more processors 104 (e.g., CPUs, ASICs, FPGAs, microprocessors, and the like), one or more communication components 112 (e.g., radios), memory 106, one or more antennas 110, and one or more communication buses 108 for interconnecting these components (sometimes called a chipset). In some embodiments, the transmitter device 102 includes one or more sensors 114 as described above with reference to FIG. 1A. In some embodiments, the transmitter device 102 includes one or more output devices such as one or more indicator lights, a sound card, a speaker, a small display for displaying textual information and error codes, etc. In some embodiments, the transmitter device 102 includes a location detection device, such as a GPS (global positioning satellite) or other geo-location receiver, for determining the location of the transmitter device 102.

The communication components 112 enable communication between the transmitter 102 and the receiver 120 (e.g., one or more communication networks). In some embodiments, the communication components 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

operating logic 216 including procedures for handling various basic system services and for performing hardware dependent tasks;

communication module 218 for coupling to and/or communicating with remote devices (e.g., remote sensors, transmitters, receivers, servers, etc.), in conjunction with communication component(s) 112 and/or antenna(s) 110;

sensor module 220 for obtaining and processing sensor data (e.g., in conjunction with sensor(s) 114) to, for example, determine the presence, velocity, and/or positioning of object in the vicinity of the transmitter 102;

power wave generating module 224 for generating and transmitting (e.g., in conjunction with antenna(s) 110) power waves. In some embodiments, the power wave generating module 224 receives instructions from the transmitter controller IC based on information provided by unidirectional communication signals received at the transmitter from the receiving device (an example of which is shown in FIG. 4);

database 226, including but not limited to:

sensor information 228 for storing and managing data received, detected, and/or transmitted by one or more sensors (e.g., sensors 114 and/or one or more remote sensors);

communication protocol information 234 for storing and managing protocol information for one or more protocols (e.g., custom or standard wireless protocols, such as ZigBee, Z-Wave, etc., and/or custom or standard wired protocols, such as Ethernet).

unidirectional advertisement structure 237 allows the first communications radio of the transmitting device to decipher information provided by a second communications radio of a receiving device in, e.g. a BLE advertisement signal.

Each of the above-identified elements (e.g., modules stored in memory 106 of the transmitter 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above, such as a tracking module for tracking the movement and positioning of objects within a transmission field.

Figure 3:
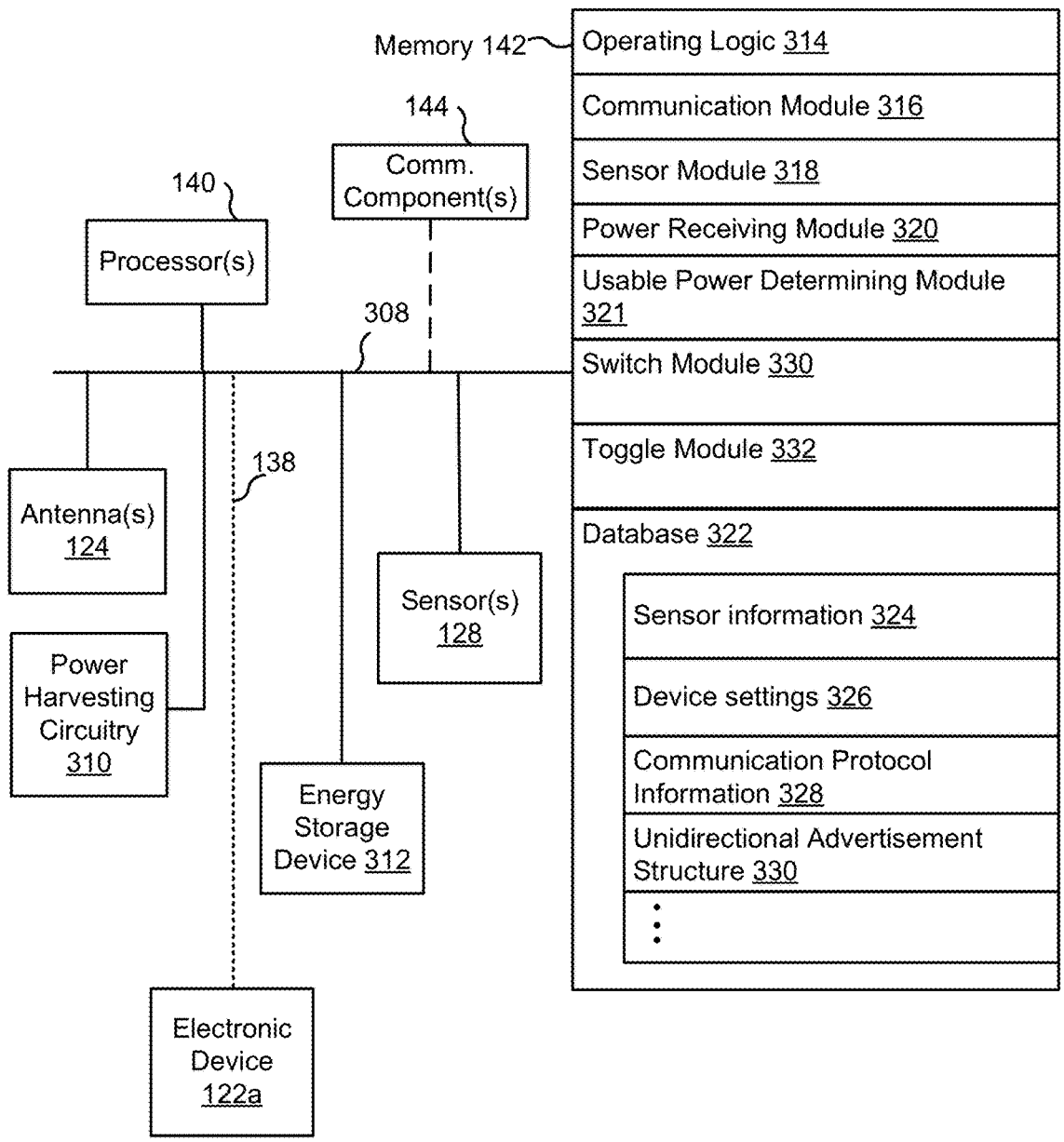
FIG. 3 is a block diagram showing components of an example RF receiver, in accordance with some embodiments.

FIG. 3 is a block diagram illustrating a representative receiver device 120 (also referred to herein as a receiver 120, a wireless power receiver 120, and wireless-power-receiving circuitry 120) in accordance with some embodiments. In some embodiments, the receiver device 120 includes one or more processors 140 (e.g., CPUs, ASICs, FPGAs, microprocessors, and the like), one or more communication components 144, memory 142, one or more antennas 124, power harvesting circuitry 310, and one or more communication buses 308 for interconnecting these components (sometimes called a chipset). In some embodiments, the receiver device 120 includes one or more sensors 128 such as one or sensors described above with reference to FIG. 1A. In some embodiments, the receiver device 120 includes an energy storage device 312 for storing energy harvested via the power harvesting circuitry 310. In various embodiments, the energy storage device 312 includes one or more batteries (e.g., battery 130, FIG. 1A), one or more capacitors, one or more inductors, and the like.

As described above with reference to FIG. 1A, in some embodiments, the receiver 120 is internally or externally connected to an electronic device (e.g., electronic device 122*a*, FIG. 1A) via a connection 138 (e.g., a bus). In some embodiments, the energy storage device 312 is part of the electronic device.

In some embodiments, the power harvesting circuitry 310 includes one or more rectifying circuits and/or one or more power converters. In some embodiments, the power harvesting circuitry 310 includes one or more components (e.g., a power converter 126) configured to convert energy from power waves and/or energy pockets to electrical energy (e.g., electricity). In some embodiments, the power harvesting circuitry 310 is further configured to supply power to a coupled electronic device (e.g., an electronic device 122), such as a laptop or phone. In some embodiments, supplying power to a coupled electronic device include translating electrical energy from an AC form to a DC form (e.g., usable by the electronic device 122).

The communication component(s) 144 enable communication between the receiver 120 and the transmitter 102 (e.g., via one or more communication networks). In some embodiments, the communication component(s) 144 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some embodiments, the receiver 120 uses a communications component of the electronic device. In some embodiments, when the receiver 120 uses a communications component of the electronic device, the receiver 120 does not include a communication component 144. In some embodiments, the communications component is external to the receiver 120.

The memory 142 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 142, or alternatively the non-volatile memory within memory 142, includes a non-transitory computer-readable storage medium. In some embodiments, the memory 142, or the non-transitory computer-readable storage medium of the memory 142, stores the following programs, modules, and data structures, or a subset or superset thereof:

operating logic 314 including procedures for handling various basic system services and for performing hardware dependent tasks;

communication module 316 for coupling to and/or communicating with remote devices (e.g., remote sensors, transmitters, other receivers, servers, electronic devices, mapping memories, etc.) in conjunction with the communication component(s) 144 and/or antenna(s) 124. For example, the communication module 316 can be used in conjunction with second communications radio of the receiving device to provide advertisement signals to a first communications radio of the transmitting device, such that the second communications radio is able to provide data packets to the first communications radio that allow the transmitter to make certain adjustment to the transmission of power to the receiving device (and all this can be done without establishing a communication channel between the first and second communications radios);

sensor module 318 for obtaining and processing sensor data (e.g., in conjunction with sensor(s) 128) to, for example, determine the presence, velocity, and/or positioning of the receiver 120, a transmitter 102, or an object in the vicinity of the receiver 120;

power receiving module 320 for receiving (e.g., in conjunction with antenna(s) 124 and/or power harvesting circuitry 310) and optionally converting (e.g., in conjunction with power harvesting circuitry 310) the energy (e.g., to direct current); transferring the energy to a coupled electronic device (e.g., an electronic device 122); and optionally storing the energy (e.g., in conjunction with energy storage device 312)

power determining module 321 for determining (in conjunction with operation of the power receiving module 320) an amount of power received by the receiver based on energy extracted from power waves (or RF test signals) and/or pockets or energy at which the power waves converge (e.g., RF signals 116, FIG. 1A). In some embodiments, the amount of power is reported in the data packets provided in the advertisement signals sent from the second communications radio of the receiving device to the first communications radio of the transmitting device;

a switch module 330 for signaling when to open a switch of the power harvesting circuitry 310 in order to stop power surges from damaging sensitive components;

A toggle module 332 for controlling the impedance mismatch in the system, which in turn can cause a portion of the incoming power to be reflected from the antenna of the wireless power receiver. By modulating the amount of power reflected by the antenna device can communicate with a wireless power transmitter without needing a dedicate communication component (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.); and database 322, including but not limited to:

sensor information 324 for storing and managing data received, detected, and/or transmitted by one or more sensors (e.g., sensors 128 and/or one or more remote sensors);

device settings 326 for storing and managing operational settings for the receiver 120, a coupled electronic device (e.g., an electronic device 122), and/or one or more remote devices; and communication protocol information 328 for storing and managing protocol information for one or more protocols (e.g., custom or standard wireless protocols, such as ZigBee, Z-Wave, etc., and/or custom or standard wired protocols, such as Ethernet).

unidirectional advertisement structure 330 allows the first communications radio of the transmitting device to decipher information provided by a second communications radio of a receiving device in, e.g. a BLE advertisement signal.

In some embodiments, the power receiving module 320 communicates the amount of power to the communication module 316, which communicates the amount of power to other remote devices (e.g., transmitter 102, FIGS. 1-2). In some embodiments, this communication model 316 transmits advertisements, and does not open a dedicated channel with any particular transmitter (e.g., transmitter 102). Moreover, in some embodiments, the power receiving module 320 may communicate the amount of power to database 322 (e.g., the database 322 stores the amount of power derived from one or more power waves 116). Alternatively, in some embodiments, the power receiving module 320 instructs the communication module 316 to transmit data packets to the remote devices (e.g., a respective data packet can include information for multiple test signals transmitted by the transmitter 102).

In some embodiments, the wireless-power transmission system described herein can be used in one or more of: near-field, NF+, mid-field, and far-field transmission applications. Near-field refers to the region around the transmission antenna that is within approximately one wavelength or less (of a power wave to be transmitted by the transmitter device at a certain frequency). Far-field refers to the region around the transmission antenna that is approximately two wavelengths or more (of a power wave to be transmitted by the transmitter device at a certain frequency). Mid-field refers to the region between near field and far field. For example, when the frequency of a transmission wave is 2.4 GHz, the NF+ range is equal or within around 0.188 m, the near-field range is equal or within around 0.125 m, the mid-field range is from around 0.125 m to around 0.25 m, and the far-field range is equal or greater than around 0.25 m. In another example, when the frequency of the transmission wave is 5 GHz, the NF+ range is equal or within around 0.09 m, the near-field range is equal or within around 0.06 m, the mid-field range is from around 0.06 m to around 0.12 m, and the far-field range is equal or greater than around 0.12 m. In some embodiments, the operating frequency ranges from 400 MHz to 60 GHz.

Each of the above identified elements (e.g., modules stored in memory 142 of the receiver 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 142, optionally, stores a subset of the modules and data structures identified above. Furthermore, the memory 142, optionally, stores additional modules and data structures not described above, such as an identifying module for identifying a device type of a connected device (e.g., a device type for an electronic device 122).

Simplex NF/NF+ Software Design

Overview

In some embodiments, in a simplex mode the communication between a wireless-power transmitting device (e.g., transmitter 402 in FIG. 4, equivalent to transmitter 102 in FIG. 1) and wireless-power receiving device (e.g., receiver 404 in FIG. 4, equivalent to receiver 120 in FIG. 1) happens in one direction (e.g., unidirectional communication). In some embodiments, a Bluetooth Low Energy (BLE) advertisement (e.g., indicated by BLE advertisement arrow 406 in FIG. 4) from a receiver 404 is used by the transmitter 402 as a pseudo one-way communication channel to receive the advertisements. The following description describes the system requirements, operation/provisioning modes, design, and implementation details of at least one embodiment.

Acronyms Used in the Descriptions Herein

| | |
|---|---|
| AD | Advertisement Data |
| ADV | Advertisement |
| AFV | Advertisement Format Version |
| API | Application Programming Interface |
| BLE | Bluetooth Low Energy |
| RX | Receiver |
| TX | Transmitter |
| RF | Radio Frequency |
| WPT | Wireless Power Transfer |

Advantages

Below is a summary of example advantages of the disclosed embodiments. In some embodiments, the secure wireless transmission of power using unidirectional communication is advantageous because it is simpler to implement for end customers. In some embodiments, the amount of software code on the wireless-power receiving device is minimal. In some embodiments, wireless-power-transmitting device 402 is able to verify that the wireless-power-receiving device 404 receives power based on only the one-way communications it receives from the wireless-power-receiving device 404. The system also has the ability to cease sending power to a receiver that is already being sent power by nearby transmitters. In some embodiments, the wireless-power-transmitter includes counter measures for combating unauthorized receivers or mitigating replay while receiving broadcasts from a wireless-power-transmitting device.

In some embodiments, wireless-power-receiving device broadcasts, via BLE advertisements, the below information corresponding to power, voltage, battery percentage, and charge status. In some embodiments, the wireless-power receiving device can broadcast, via BLE advertisements, whether a storage element (e.g., a battery, capacitor, etc.) of the wireless-power-receiving device requires charging. In some embodiments, the wireless-power receiving device can broadcast, via BLE advertisements, the condition of the storage element associated with the wireless-power-receiving device is in a critical state (e.g., not within operating temperature, overcharged, undercharged, or another error associated with storage elements). In some embodiments, the wireless-power receiving device can broadcast, via BLE advertisements, whether the wireless-power-receiving device is within range of the wireless-power-transmitter device or not (e.g., the array voltage is detected). In some embodiments, the wireless-power receiving device can broadcast, via BLE advertisements, that the storage element associated with the wireless-power-receiving device is not charging. In some embodiments, the wireless-power receiving device can broadcast, via BLE advertisements, that the storage element associated with the wireless-power-receiving device is charging but needs more power from the wireless-power-transmitting device. In some embodiments, the wireless-power receiving device can broadcast, via BLE advertisements, that the storage element associated with the wireless-power-receiving device is charging at an optimal configured rate from the wireless-power-transmitting device. In some embodiments, the wireless-power receiving device can broadcast, via BLE advertisements, that the storage element associated with the wireless-power-receiving device is charging but is receiving too much power from the wireless-power-transmitting device. In some embodiments, the wireless-power receiving device can broadcast, via BLE advertisements, that the storage element and/or the wireless-power-receiving device is presenting a fault condition.

System Communication Model

In some embodiments, the wireless-power-transmitting device 404 monitors received wireless-power-transmission signals in accordance with the broadcasted data packet (e.g., BLE advertisement broadcasted from the wireless-power-transmitting device 402). For example, FIG. 4 first shows arrow 406 that corresponds to a BLE advertisement, and then shows at a later time a change in received RF power, as indicated by arrow 408 stating "RF Power"). In some embodiments, the wireless-power-receiving device 402 continuously updates its broadcasted data packets (e.g., BLE advertisement data) with its current charging state of the storage element associated with the wireless-power-receiving device 402, the voltage, power received from the wireless-power-transmitting device 404, and whether more or less power is required from the wireless-power-transmitting device 404, etc. (e.g., as indicated by text box 410 in FIG. 4 that recites that advertising occurs every 100 ms).

In some embodiments, the wireless-power-transmitting device 404 confirms the received broadcasted data packets (e.g., reporting) from the wireless-power-receiving device 402 is correct for the transmitter's state For example, in some embodiments, this is achieved by having the wireless-power-transmitting device 404 use a pattern (e.g., a random pattern) of turning the power ON and OFF the power emitted by the wireless-power-transmitting device 404 and determining, via the wireless-power-transmitting device, whether the wireless-power-receiving device's 402 broadcasted information that includes received power information (e.g., the reporting values) corresponds to the power transmitted by the wireless-power-transmitting device 404 (e.g., as indicated in FIG. 4 by the process block 412, which illustrates such an interaction). This confirmation process ensures that the wireless-power-transmitting device 404 is tracking the correct wireless-power-receiving device(s) 402 even if other transmitters (e.g., ones provided by manufacturer different from the transmitter implementing the simplex communication method described herein) is charging other wireless-power-receiving devices nearby. An illustration of this interaction is shown in FIG. 4.

In some embodiments, each of the additional wireless power-transmission signals (e.g., arrow 416 stating "RF Power" in FIG. 4) has a certain power level that is both predetermined by the wireless-power-transmitting device 402 and is a higher power level than the power level that was used for a first wireless-power-transmission signal (e.g., arrow 408 stating "RF Power" in FIG. 4). In this way, receipt of the additional wireless-power-transmission signals at the wireless-power-receiving device 404 can be verified by the wireless-power-transmitting device 404 by checking a reported power level from the wireless-power-receiving device 402 (e.g., arrow 416 stating "RF Power" in FIG. 4).

System Supported Modes

In some embodiments, the system communication model is an open mode, and there is no authentication and/or encryption in this mode. In some embodiments, the open mode can be useful for devices with very small memory footprints (e.g., 32 kBs) and charging requirements where data protection is not required.

In some embodiments, the system is protected, and data will be encrypted using shared key. For example, in some embodiments at least some portions of the data included in the broadcasted data packets (e.g., BLE advertisements and/or WPT beacon) will be encrypted using a shared key. This mode provides a level of security without taking up much memory space. The shared key can be protected to avoid potential security threats, and the shared key in some embodiments can be provisioned at the manufacturing time.

In some embodiments, the system is private, and authentication and encryption are provided using public key cryptography. For example, in some embodiments at least some portions of the data included in the broadcasted data packets (e.g., BLE advertisements and/or WPT beacon) will be encrypted using a public key. In some embodiments, wireless-power-receiving device 402 and wireless-power-transmitting device 404 can be provisioned using the public key of another party to derive a common pre-shared key. This key can be directly or indirectly used to encrypt the data found within the broadcast. This security mode provides additional security compared to the other modes described above. In some embodiments, this mode has keys that are dynamically generated.

Receiver ADV Service Data Format

In some embodiments, data packets that are broadcasted by the second communications radio (also referred to herein as BLE advertisements for embodiments in which BLE radios are used) include a predetermined format, an example of that format is provided below for reference:

| Byte Number | Encryption | Length | Value  | Description |
|---|---|---|---|---|
| 0 | Open | 1 | 0x12 | Length of Advertisement Data |
| 1 |  | 1 | 0x16 | Service Data Type |
| 2 |  | 2 | 0xFFFC | Airfuel Alliance SDO |
| 4 |  | 1 | 0x00 | Technology Type, RF-A, Manufacturer Specific |
| 5 |  | 1 | 0x5X | Advertisement Format Version (AFV) |
| 6 | Encrypted | 2 | 0xXX | Sequence Counter |
| 8 |  | 1 | 0xXX | Receiver AD Flags |
| 9 |  | 1 | 0x00 | BLE TX power in dBm (Signed) |
| 10 |  | 1 | 0x00 | Battery Percentage (Encoded) |
| 11 |  | 2 | 0x0000 | Device Power in mW (Encoded) |
| 13 |  | 2 | 0x0000 | Array Voltage in mV (Encoded) |
| 15 |  | 2 | 0x0000 | Load Voltage in mV (Encoded) |
| 17 |  | 2 | 0x0000 | Array Power in mW (Encoded) |
| 19 |  | 2 | 0x0000 | Battery Voltage in mV (Encoded) |

In other words, in some embodiments, the data packet and the additional data packet(s) provided by the second communications radio include information pertaining to: Length of Advertisement Data, Service Data Type, Airfuel Alliance SDO, Technology Type, RF-A, manufacturer specific, Advertisement Format Version (AFV), Sequence Counter, Receiver AD Flags, BLE TX power in dBm (Signed), Battery Percentage (Encoded), Device Power in mW (Encoded), Array Voltage in mV (Encoded), Load Voltage in mV (Encoded), Array Power in mW (Encoded), and/or Battery Voltage in mV (Encoded). In some embodiments, a first set of the data included in the data packets that are broadcasted by the receivers is encrypted/encoded, while a second set of the data included in the data packets that are broadcasted by the receivers is not encrypted/encoded.

Additional details regarding the data included with some of the bytes in the data packets that are broadcasted by the receivers are also provided below.

Receiver Advertisement Format Version

The below table illustrates additional structure/information concerning byte 5 in the example data packets broadcasted by a receiver device that were discussed above. This additional structure/information helps to ensure a common advertisement messaging structure that supports multiple types of devices. Using this structure, communicating devices can distinguish the type of device, their supported message formats, and their encryption status. This also allows for future modification of the message structure without breaking backwards compatibility.

| Bit | 7 | 6 | 5 | 4 | 3 | 2 | 1 | 0 |
|---|---|---|---|---|---|---|---|---|
| Desc | Protocol Version | | | | Encr | MF/FF | NF/NF+ | 0-TX 1-RX |

In some embodiments, at least four bits of the common advertisement messaging structure is allocated to the protocol version. In some embodiments, at least one bit of the common advertisement messaging structure is allocated to encryption. In some embodiments, at least one bit of the common advertisement messaging structure is allocated to MF/FF data. In some embodiments, at least one bit of the common advertisement messaging structure is allocated to NF/NF+ data. In some embodiments, at least one bit of the common advertisement messaging structure is allocated to information as to whether the data corresponds to the transmitter or receiver.

Receiver AD Flags

The below table illustrates additional structure/information concerning byte 8 in the example data packets broadcasted by a receiver device that were discussed above. The below table shows a set of flags that indicate a receiver's charging status, which helps a transmitter determine the best charging algorithm for optimal system performance (e.g., a charging algorithm that ensures the receiver is receiving an amount of usable power that is sufficient to provide power or charge to the receiver).

| Bit | 7 | 6 | 5 | 4 | 3 | 2 | 1 | 0 |
|---|---|---|---|---|---|---|---|---|
| Desc | 0-1 Byte Status 1-2 Byte Status | Charge Status | | | On Charger | Battery Critical | Charge Required | Connectable |

Charge Status

In some embodiments, the example data packets broadcasted by a receiver device that were discussed above can include information related to a charge status of the receiver device. The table below details examples of the different charge statuses that the broadcasted data packets can convey. These are provided to the transmitter to help it determine the best charging algorithm (e.g., a charging algorithm that ensures the receiver is receiving an amount of usable power that is sufficient to provide power or charge to the receiver).

| Bit 6 | Bit 5 | Bit 4 | Description |
|---|---|---|---|
| 0 | 0 | 0 | 0-Not Charging |
| 0 | 0 | 1 | 1-Increment Required |
| 0 | 1 | 0 | 2-Power Optimal |
| 0 | 1 | 1 | 3-Decrement Required |
| 1 | 0 | 0 | 4-Fault |
| 1 | 0 | 1 | 5-Busy |
| — | — | — | Other Values Reserved |

The methods described herein can make use of the charging status information to help improve charging operations. For instance, the methods described herein can include an operation of: in accordance with a determination that broadcasted data packet from a wireless-power-receiving device includes information regarding the wireless-power-receiving device's charge status, the wireless-power-transmitting device is then configured to make an adjustment to the transmission of wireless power that is based on the charging status information (e.g., if the bits 4 through 6 indicate that the receiver requires an increment, then the wireless-power-transmitting device can adjust the transmission of wireless power by increasing a power level with which the power is being delivered to the receiver.

Receiver Charger Detection

In some embodiments, the a device with which the receivers described herein are coupled (e.g., an electronic device configured to receive usable power from the receiver device) can perform charger polling (which can be referred to as receiver charge detection herein) during which an application running on the device can periodically poll (e.g., once every 1 or 2 minutes) for presence of a wireless-power transmitter in proximity to the receiver. Once the charger is detected (e.g., because a power transmission signal is received at the receiver), then the application running on the device can cause can the receiver to begin running a new routine or another software program that causes the receiver to update its broadcasted data packet (e.g., as indicated by the process 414 shown in FIG. 4).

In some embodiments, the receiver charge detection is a receiver single image with charger interrupt. In this mode, the device with which the receiver is coupled can configure a Varray pin as GPIO and interrupt logic HIGH, in accordance with one example technique. The interrupt will be generated once the receiver is put on the charger. The application can start the new routine or other software program discussed above and can update the information included in the broadcasted data packets (e.g., as indicated by the process 414 shown in FIG. 4).

In some embodiments, the receiver charge detection is a receiver dual image. In this mode, the charger detection should be part of the device with which the receiver is coupled. This can be performed by either polling or interrupt. On charger detection customer image can load the new routine or other software program discussed above.

Additional Description of Example Embodiments

Figure 5A:
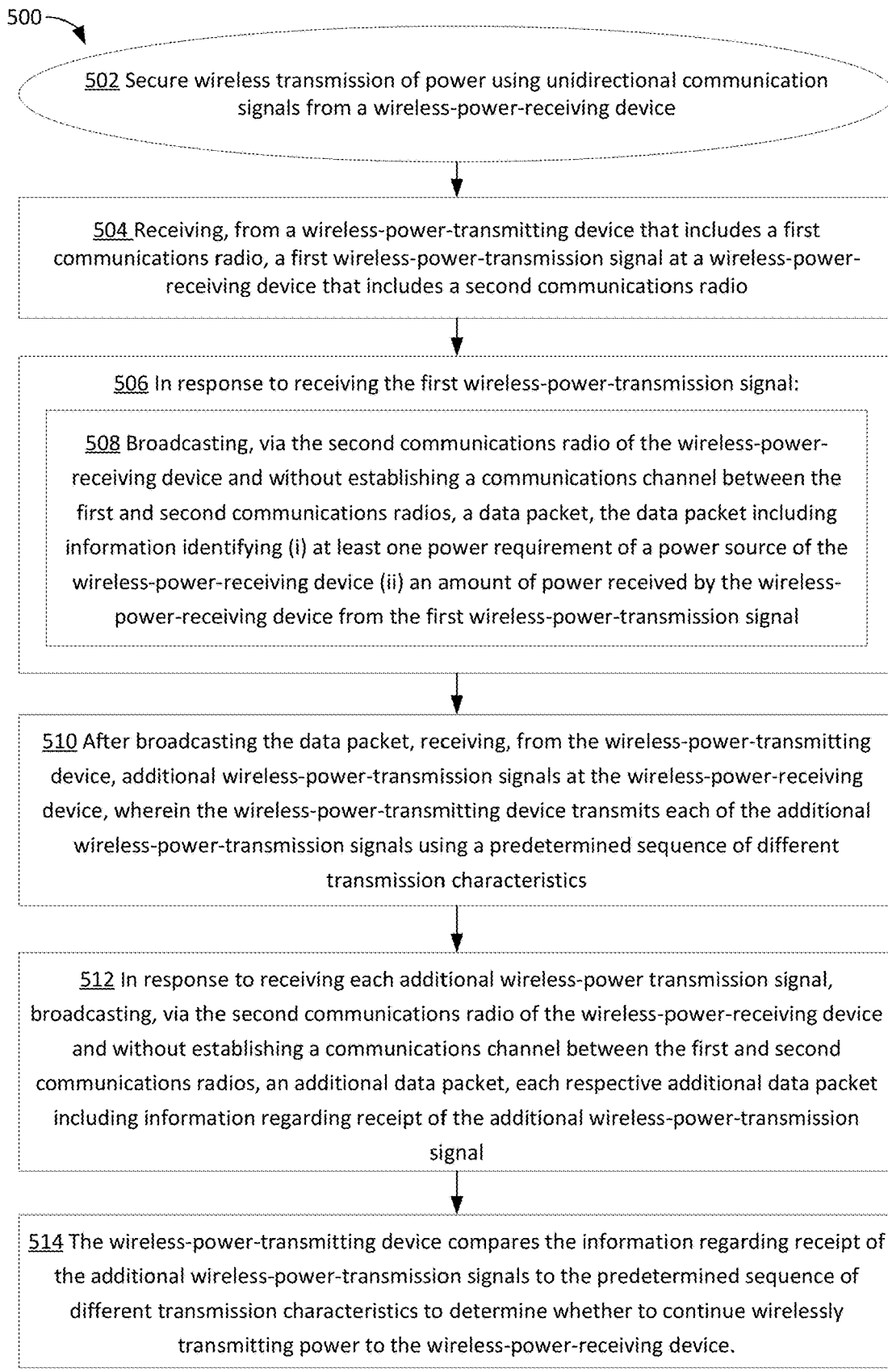

FIGS. 5A-5C show flow diagrams of a method of transmitting unidirectional communication signals, in accordance with some embodiments. Specifically, FIG. 5A-5C shows a method 500 of securing (502) wireless transmission of power using unidirectional communication signals from a wireless-power-receiving device occurs at a wireless-power-receiving device (e.g., receiver 120 in FIG. 1A, receiver 120 in FIG. 3, and receiver 404 (equivalent to receiver 120) FIG. 4).

In some embodiments, a wireless-power-receiving device receives (504), from a wireless-power-transmitting device (e.g., transmitter 102 in FIG. 1A, transmitter 102 in FIG. 2, and wireless-power transmitting device 402 (equivalent to transmitter 102) in FIG. 4) that includes a first communications radio, a first wireless-power-transmission signal at a wireless-power-receiving device that includes a second communications radio.

In some embodiments, in response to the a wireless-power-receiving device receiving (506) the first wireless-power-transmission signal (e.g., FIG. 4 shows an arrow 418 that indicates that a WPT Beacon is transmitted from the wireless-power-transmitting device 404): broadcasting (508), via the second communications radio of the wireless-power-receiving device and without establishing a communications channel between the first and second communications radios, a data packet, the data packet including information identifying (i) at least one power requirement of a power source of the wireless-power-receiving device (ii) an amount of power received by the wireless-power-receiving device from the first wireless-power-transmission signal (e.g., FIG. 4 shows an arrow 406 indicating that a BLE advertisement is broadcasted from the wireless-power-receiving device 404).

In some embodiments, after broadcasting the data packet, receiving (510), from the wireless-power-transmitting device, additional wireless-power-transmission signals at the wireless-power-receiving device (e.g., FIG. 4 shows an arrow 408 that indicates that additional wireless-power-transmission signals have been sent from the wireless-power-transmitting device 402). In some embodiments, the wireless-power-transmitting device transmits each of the additional wireless-power-transmission signals using a predetermined sequence of different transmission characteristics (e.g., as indicated in FIG. 4 by the process block 412).

In some embodiments, in response to the wireless-power-receiving device receiving each additional wireless-power transmission signal, broadcasting (512), via the second communications radio of the wireless-power-receiving device and without establishing a communications channel between the first and second communications radios, an additional data packet (e.g., FIG. 4 shows an arrow 420 that indicates an additional data packet), each respective additional data packet including information regarding receipt of the additional wireless-power-transmission signal.

In some embodiments, the wireless-power-transmitting device compares (514) the information regarding receipt of the additional wireless-power-transmission signals to the predetermined sequence of different transmission characteristics to determine whether to continue wirelessly transmitting power to the wireless-power-receiving device (e.g., as indicated in FIG. 4 by the process block 412).

Turning next to FIG. 5B and continuing the description of method 500, in some embodiments, the data packet and the additional data packets are broadcast (516) via a Bluetooth low energy (BLE) communication protocol (e.g., arrows 406 and 420 in FIG. 4 indicate that BLE advertisements are broadcasted from the wireless-power-receiving device 404).

In some embodiments, the additional data packets include information that causes the wireless-power-transmitting device to adjust (518) characteristics of the additional wireless-power-transmission signals provided to the wireless-power receiving device (e.g., FIG. 4 illustrates that after the transmitter 402 receives the BLE advertisement, as indicated by arrow 406, the wireless power transmitting device 402 begins sending additional RF power, as indicated by arrow 408). In some embodiments, the wireless-power-transmitting device (e.g., transmitter 402 in FIG. 4) adjusts characteristics of the additional wireless power transmission signals when the information specifies that the wireless-power-transmitting device (i) is not charging, (ii) is charging but needs more power, (iii) is charging at an optimal configured rate, (iv) is charging but is receiving too much power, and (v) has a fault condition.

In some embodiments, the wireless-power-receiving device is within a wireless-power-transmission range of the wireless-power-transmitting device when the second communications radio transmits (520) the data packet (e.g., as indicated by text box 422 in FIG. 4 that states "On Charger Detection" and after that detection occurs the BLE Advertisement is sent, as indicated by arrow 406 in FIG. 4).

In some embodiments, the wireless-power-transmission range is near-field transmission range of less than or equal to 12 inches from the wireless-power-transmitting device (522) (e.g., as indicated by text box 424 that states that the "user places receiver on top of transmitter"). In some embodiments, the wireless-power-transmission range is a far-field transmission range of greater than 12 inches from the wireless-power transmission device (524).

In some embodiments, the wireless-power-receiving device is placed (526) within the wireless-power-transmission range before receiving the first wireless-power-transmission signal at the wireless-power-receiving device and while the first communications radio of the wireless-power-transmitting device is not scanning (e.g., as indicated by text box 424). In some embodiments, the wireless-power-transmitting device causes (526) the first communications radio to begin scanning for broadcasted data packets in response to detecting the wireless-power-receiving device within the wireless-power-transmission range (e.g., as indicated by text box 426 in FIG. 4 that states "receiver detected BLE scanning enabled").

Turning next to FIG. 5C and continuing the description of method 500, in some embodiments, the predetermined sequence of different transmission characteristics is a sequence in which the wireless-power-transmitting device sends (528) the additional wireless-power-transmission signals at different points in time by toggling transmissions on and off over a given period of time (e.g., as indicated in FIG. 4 by the process block 412).

In some embodiments, the predetermined sequence of different transmission characteristics is a sequence in which the wireless-power-transmitting device transmits (530) each of the additional wireless-power-transmission signals using different power levels (e.g., as indicated in FIG. 4 by the process block 412).

In some embodiments, the second communications radio of the wireless-power-receiving device communicates (532) in a unidirectional manner with the first communications radio of the wireless-power-transmitting device and does not receive communication from the wireless-power-transmitting device (e.g., as shown in FIG. 4).

In some embodiments, the wireless-power-receiving device broadcasts (534) each of the data packet and the additional data packets at a predetermined time interval (e.g., as shown by text box 410 indicating that BLE advertisements are sent every preset period of time). In some embodiments, the predetermined time interval is equal to 100 ms or less (536) (e.g., as shown by text box 410 indicating that BLE advertisements are sent every 100 ms). In some embodiments, the predetermined time interval is adjustable and can be configured to be 50 ms, 100 ms, 200 ms, 300 ms, 500 ms, or any value below 300 ms. This allows for quick transmission of packets, which causes a quicker response in adjusting power from the wireless-power-transmitting device, Consequently, resulting in better control of the charging characteristics without damaging the battery or other equipment of the wireless-receiving-receiving device.

In some embodiments, the data packet and each respective additional data packet include information about current charging state, voltage, power received from the wireless-power-transmitting device, and information indicating whether more or less power is required (538) (e.g., BLE advertisements 406 and 420 shown in FIG. 4 include this information).

In some embodiments, the data packet and each respective additional data packet include encrypted data (540) (e.g., BLE advertisements 406 and 420 shown in FIG. 4 can include encrypted data).

In some embodiments, the wireless-power-receiving device includes a wireless-power-receiving circuit with power-harvesting circuitry and a memory of approximately 32 KBs (542) (e.g., FIG. 3 showing components of an example RF receiver), and the memory stores instructions that cause the wireless-power-receiving device to perform the instructions of the discussed unidirectional charging process. In some embodiments, these instructions occupy approximately 5 KBs or less of the memory (542). As compared to other systems, an instruction size of 5 KBs represents a significant reduction in the program space, thereby freeing up memory space for other purposes on the receiver side (e.g., receiver 120 in FIG. 3). In this way, the techniques described herein allow the receiver chip to operate more efficiently (e.g., receiver 120 in FIG. 3).

In some embodiments, data packet and the additional data packet also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition (544) (e.g., BLE advertisements 406 and 420 in FIG. 4 include this information).

In some embodiments, a wireless-power-receiving device that includes a wireless-power-receiving circuit having a memory storing instructions for securely transmitting wireless power using unidirectional communication signals from a wireless-power-receiving device, the instructions causing performance of any of the above discussed features. In some embodiments, a system comprises a receiver and a transmitter, wherein the receiver and transmitter are configured to perform operations to allow for execution of any of the above-discussed features. A non-transitory computer-readable storage medium including instructions that, when executed by one or more processors of a wireless-power-receiving device, cause the one or more processors to perform or cause performance of any of the above discussed features. A wireless-power-receiving device comprising means for causing performance of any of the above-discussed features.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of this disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 206, 256) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of secure wireless transmission of power using unidirectional communication signals from a wireless-power-receiving device, comprising:
   receiving, from a wireless-power-transmitting device that includes a first communications radio, a first wireless-power-transmission signal at a wireless-power-receiving device that includes a second communications radio;
   in response to receiving the first wireless-power-transmission signal:
      broadcasting, via the second communications radio of the wireless-power-receiving device and without establishing a communications channel between the first and second communications radios, a data packet, the data packet including information identifying (i) at least one power requirement of a power source of the wireless-power-receiving device (ii) an amount of power received by the wireless-power-receiving device from the first wireless-power-transmission signal;
   after broadcasting the data packet, receiving, from the wireless-power-transmitting device, additional wireless-power-transmission signals at the wireless-power-receiving device, wherein the wireless-power-transmitting device transmits each of the additional wireless-power-transmission signals using a predetermined sequence of different transmission characteristics;
   in response to receiving each additional wireless-power transmission signal, broadcasting, via the second communications radio of the wireless-power-receiving device and without establishing a communications channel between the first and second communications radios, additional data packets, each respective additional data packet including information regarding receipt of a respective additional wireless-power-transmission signal of the additional wireless-power-transmission signals,
   wherein the wireless-power-transmitting device compares the information regarding receipt of the additional wireless-power-transmission signals to the predetermined sequence of different transmission characteristics to determine whether to continue wirelessly transmitting power to the wireless-power-receiving device.

2. The method of claim 1, wherein the data packet and the additional data packets are broadcast via a Bluetooth low energy (BLE) communication protocol.

3. The method of claim 1, wherein the additional data packets include information that causes the wireless-power-transmitting device to adjust characteristics of the additional wireless-power-transmission signals provided to the wireless-power receiving device, wherein the wireless-power-transmitting device adjusts characteristics of the additional wireless power transmission signals when the information specifies that the wireless-power-receiving device (i) is not charging, (ii) is charging but needs more power, (iii) is charging at an optimal configured rate, (iv) is charging but is receiving too much power, or (v) has a fault condition.

4. The method of claim 1, wherein the wireless-power-receiving device is within a wireless-power-transmission range of the wireless-power-transmitting device when the second communications radio transmits the data packet.

5. The method of claim 4, wherein the wireless-power-transmission range is a near-field transmission range of less than or equal to 12 inches from the wireless-power-transmitting device.

6. The method of claim 4, wherein the wireless-power-transmission range is a far-field transmission range of greater than 12 inches from the wireless-power-transmitting device.

7. The method of claim 4, wherein:
the wireless-power-receiving device is placed within the wireless-power-transmission range before receiving the first wireless-power-transmission signal at the wireless-power-receiving device and while the first communications radio of the wireless-power-transmitting device is not scanning, and
the wireless-power-transmitting device causes the first communications radio to begin scanning for broadcasted data packets in response to detecting the wireless-power-receiving device within the wireless-power-transmission range.

8. The method of claim 1, wherein the predetermined sequence of different transmission characteristics is a sequence in which the wireless-power-transmitting device sends the additional wireless-power-transmission signals at different points in time by toggling transmissions on and off over a given period of time.

9. The method of claim 1, wherein the predetermined sequence of different transmission characteristics is a sequence in which the wireless-power-transmitting device transmits each of the additional wireless-power-transmission signals using different power levels.

10. The method of claim 1, wherein the second communications radio of the wireless-power-receiving device communicates in a unidirectional manner with the first communications radio of the wireless-power-transmitting device and does not receive communication from the wireless-power-transmitting device.

11. The method of claim 1, wherein the wireless-power-receiving device broadcasts each of the data packet and the additional data packets at a predetermined time interval.

12. The method of claim 11, wherein the predetermined time interval is equal to 100 ms or less.

13. The method of claim 1, wherein the data packet and each respective additional data packet include information about current charging state, voltage, power received from the wireless-power-transmitting device, and information indicating whether more or less power is required.

14. The method of claim 1, wherein the data packet and each respective additional data packet include encrypted data.

15. The method of claim 1, wherein the wireless-power-receiving device includes a wireless-power-receiving circuit with power-harvesting circuitry and a memory of approximately 32 kilobytes (KBs), and the memory stores instructions that cause the wireless-power-receiving device to perform the method of claim 1, and the instructions occupy approximately 5 KBs or less of the memory.

16. The method of claim 1, wherein the data packet and the additional data packets also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition.

17. A wireless-power-receiving device, comprising:
a power source configured to provide usable power to the wireless-power-receiving device;
a second communications radio configured to:
receive a first wireless-power-transmission signal from a wireless-power-transmitting device that includes a first communications radio;
broadcast, without establishing a communications channel between the first and second communications radios, a data packet, the data packet including information identifying (i) at least one power requirement of the power source of the wireless-power-receiving device (ii) an amount of power received by the wireless-power-receiving device from the first wireless-power-transmission signal;
after broadcasting the data packet, receive, from the wireless-power-transmitting device, additional wireless-power-transmission signals, wherein the wireless-power-transmitting device transmits each of the additional wireless-power-transmission signals using a predetermined sequence of different transmission characteristics;
one or more processors configured to respond to the receiving of each additional wireless-power transmission signal by causing the second communications radio to broadcast, without establishing a communications channel between the first and second communications radios, additional data packets, each additional data packet including information regarding receipt of a respective additional wireless-power-transmission signal of the additional wireless-power-transmission signals,
wherein the wireless-power-transmitting device compares the information regarding receipt of the additional wireless-power-transmission signals to the predetermined sequence of different transmission characteristics to determine whether to continue wirelessly transmitting power to the wireless-power-receiving device.

18. The wireless-power-receiving device of claim 17, wherein the data packet and the additional data packets are broadcast via a Bluetooth low energy (BLE) communication protocol.

19. The wireless-power-receiving device of claim 17, wherein the additional data packets include information that causes the wireless-power-transmitting device to adjust characteristics of the additional wireless-power-transmission signals provided to the wireless-power receiving device, wherein the wireless-power-transmitting device adjusts characteristics of the additional wireless power transmission signals when the information specifies that the wireless-power-receiving device (i) is not charging, (ii) is charging but needs more power, (iii) is charging at an optimal configured rate, (iv) is charging but is receiving too much power, or (v) has a fault condition.

20. The wireless-power-receiving device of claim 17, wherein the wireless-power-receiving device is within a wireless-power-transmission range of the wireless-power-transmitting device when the second communications radio transmits the data packet.

21. The wireless-power-receiving device of claim 20, wherein the wireless-power-transmission range is a near-field transmission range of less than or equal to 12 inches from the wireless-power-transmitting device.

22. The wireless-power-receiving device of claim 20, wherein the wireless-power-transmission range is a far-field transmission range of greater than 12 inches from the wireless-power-transmitting device.

23. The wireless-power-receiving device of claim 20, wherein:
the wireless-power-receiving device is placed within the wireless-power-transmission range before receiving the first wireless-power-transmission signal at the wireless-power-receiving device and while the first communications radio of the wireless-power-transmitting device is not scanning, and
the wireless-power-transmitting device causes the first communications radio to begin scanning for broadcasted data packets in response to detecting the wireless-power-receiving device within the wireless-power-transmission range.

24. The wireless-power-receiving device of claim 17, wherein the predetermined sequence of different transmission characteristics is a sequence in which the wireless-power-transmitting device sends the additional wireless-power-transmission signals at different points in time by toggling transmissions on and off over a given period of time.

25. The wireless-power-receiving device of claim 17, wherein the predetermined sequence of different transmission characteristics is a sequence in which the wireless-power-transmitting device transmits each of the additional wireless-power-transmission signals using different power levels.

26. The wireless-power-receiving device of claim 17, wherein the second communications radio of the wireless-power-receiving device communicates in a unidirectional manner with the first communications radio of the wireless-power-transmitting device and does not receive communication from the wireless-power-transmitting device.

27. The wireless-power-receiving device of claim 17, wherein the wireless-power-receiving device broadcasts each of the data packet and the additional data packets at a predetermined time interval.

28. The wireless-power-receiving device of claim 27, wherein the predetermined time interval is equal to 100 ms or less.

29. The wireless-power-receiving device of claim 17, wherein the data packet and each respective additional data packet include information about current charging state, voltage, power received from the wireless-power-transmitting device, and information indicating whether more or less power is required.

30. The wireless-power-receiving device of claim 17, wherein the data packet and each respective additional data packet include encrypted data.

31. The wireless-power-receiving device of claim 17, wherein the wireless-power-receiving device includes a wireless-power-receiving circuit with power-harvesting circuitry and a memory of approximately 32 kilobytes (KBs), and the memory stores instructions that cause the wireless-power-receiving device to perform the operations of claim 17, and the instructions occupy approximately 5 KBs or less of the memory.

32. The wireless-power-receiving device of claim 17, wherein the data packet and the additional data packets also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition.

33. A non-transitory computer-readable storage medium including instructions that, when executed by one or more processors of a wireless-power-receiving device, cause the wireless-power-receiving device to:
receive, from a wireless-power-transmitting device that includes a first communications radio, a first wireless-power-transmission signal at a wireless-power-receiving device that includes a second communications radio;
in response to receiving the first wireless-power-transmission signal:
broadcast, via the second communications radio of the wireless-power-receiving device and without establishing a communications channel between the first and second communications radios, a data packet, the data packet including information identifying (i) at least one power requirement of a power source of the wireless-power-receiving device (ii) an amount of power received by the wireless-power-receiving device from the first wireless-power-transmission signal;
after broadcasting the data packet, receive, from the wireless-power-transmitting device, additional wireless-power-transmission signals at the wireless-power-receiving device, wherein the wireless-power-transmitting device transmits each of the additional wireless-power-transmission signals using a predetermined sequence of different transmission characteristics;
in response to receiving each additional wireless-power transmission signal, broadcast, via the second communications radio of the wireless-power-receiving device and without establishing a communications channel between the first and second communications radios, an additional data packet, each respective additional data packet including information regarding receipt of a respective wireless-power-transmission signal of the additional wireless-power-transmission signals,
wherein the wireless-power-transmitting device compares the information regarding receipt of the additional wireless-power-transmission signals to the predetermined sequence of different transmission characteristics to determine whether to continue wirelessly transmitting power to the wireless-power-receiving device.

34. The non-transitory computer-readable storage medium of claim 33, wherein the data packet and the additional data packets are broadcast via a Bluetooth low energy (BLE) communication protocol.

35. The non-transitory computer-readable storage medium of claim 33, wherein the additional data packets include information that causes the wireless-power-transmitting device to adjust characteristics of the additional wireless-power-transmission signals provided to the wireless-power receiving device, wherein the wireless-power-transmitting device adjusts characteristics of the additional wireless power transmission signals when the information specifies that the wireless-power-receiving device (i) is not charging, (ii) is charging but needs more power, (iii) is charging at an optimal configured rate, (iv) is charging but is receiving too much power, or (v) has a fault condition.

36. The non-transitory computer-readable storage medium of claim 33, wherein the wireless-power-receiving device is within a wireless-power-transmission range of the wireless-power-transmitting device when the second communications radio transmits the data packet.

37. The non-transitory computer-readable storage medium of claim 36, wherein the wireless-power-transmission range is a near-field transmission range of less than or equal to 12 inches from the wireless-power-transmitting device.

38. The non-transitory computer-readable storage medium of claim 36, wherein the wireless-power-transmission range is a far-field transmission range of greater than 12 inches from the wireless-power-transmitting device.

39. The non-transitory computer-readable storage medium of claim 36, wherein:
the wireless-power-receiving device is placed within the wireless-power-transmission range before receiving the first wireless-power-transmission signal at the wireless-power-receiving device and while the first communications radio of the wireless-power-transmitting device is not scanning, and
the wireless-power-transmitting device causes the first communications radio to begin scanning for broadcasted data packets in response to detecting the wireless-power-receiving device within the wireless-power-transmission range.

40. The non-transitory computer-readable storage medium of claim 33, wherein the predetermined sequence of different transmission characteristics is a sequence in which the wireless-power-transmitting device sends the additional wireless-power-transmission signals at different points in time by toggling transmissions on and off over a given period of time.

41. The non-transitory computer-readable storage medium of claim 33, wherein the predetermined sequence of different transmission characteristics is a sequence in which the wireless-power-transmitting device transmits each of the additional wireless-power-transmission signals using different power levels.

42. The non-transitory computer-readable storage medium of claim 33, wherein the second communications radio of the wireless-power-receiving device communicates in a unidirectional manner with the first communications radio of the wireless-power-transmitting device and does not receive communication from the wireless-power-transmitting device.

43. The non-transitory computer-readable storage medium of claim 18, wherein the wireless-power-receiving device broadcasts each of the data packet and the additional data packets at a predetermined time interval.

44. The non-transitory computer-readable storage medium of claim 33, wherein the predetermined time interval is equal to 100ms or less.

45. The non-transitory computer-readable storage medium of claim 33, wherein the data packet and each respective additional data packet include information about current charging state, voltage, power received from the wireless-power-transmitting device, and information indicating whether more or less power is required.

46. The non-transitory computer-readable storage medium of claim 33, wherein the data packet and each respective additional data packet include encrypted data.

47. The non-transitory computer-readable storage medium of claim 33, wherein the wireless-power-receiving device includes a wireless-power-receiving circuit with power-harvesting circuitry and a memory of approximately 32 kilobytes (KBs), and the memory stores the instructions that cause the wireless-power-receiving device to perform the operations of claim 33, and the instructions occupy approximately 5 KBs or less of the memory.

48. The non-transitory computer-readable storage medium of claim 33, wherein the data packet and the additional data packets also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition.

* * * * *